United States Patent [19]
Hamanaka et al.

[11] Patent Number: 5,143,612
[45] Date of Patent: Sep. 1, 1992

[54] HOLLOW FIBER FILTER MODULE

[75] Inventors: Katsuhiko Hamanaka, Otsu; Yoshio Kanda, Fuji, both of Japan

[73] Assignee: Asahi Kasei Kobyo Kabushiki Kaisha, Osaka, Japan

[21] Appl. No.: 774,980

[22] Filed: Oct. 15, 1991

[30] Foreign Application Priority Data

Oct. 15, 1990 [JP] Japan .................. 21-271174

[51] Int. Cl.⁵ .............................. B01D 63/02
[52] U.S. Cl. .................. 210/321.8; 210/321.89
[58] Field of Search .......... 210/321.6, 321.72, 321.78, 210/321.79, 321.8, 321.87, 321.88, 321.89, 321.9

[56] References Cited

U.S. PATENT DOCUMENTS

| | | |
|---|---|---|
| 3,882,024 | 5/1975 | Holmes et al. . |
| 4,124,510 | 11/1978 | Joh . |
| 4,378,981 | 4/1983 | Otstot et al. . |
| 4,647,377 | 3/1987 | Miura . |
| 4,696,748 | 9/1987 | Nitadori et al. ................. 210/321.89 |
| 4,781,889 | 11/1988 | Fukasawa et al. ............... 210/321.8 |

FOREIGN PATENT DOCUMENTS

| | | |
|---|---|---|
| 0370858 | 5/1990 | European Pat. Off. . |
| 3927455 | 8/1990 | Fed. Rep. of Germany . |
| 62-204804 | 3/1986 | Japan . |
| 63-158103 | 6/1986 | Japan . |
| 3-16622 | 6/1989 | Japan . |
| WO 88/01895 | 3/1988 | PCT Int'l Appl. . |

Primary Examiner—Frank Sever
Attorney, Agent, or Firm—Finnegan, Henderson, Farabow, Garrett, Dunner

[57] ABSTRACT

Disclosed is a hollow fiber filter module comprising a cylindrical casing having a liquid introducing nozzle at least at one end portion thereof and having a bundle of hollow fibers disposed in the casing, and wherein one end portion of the bundle is enclosed by a hollow, liquid flow control member, and the liquid introducing nozzle has a specific unique structure in which the inlet opening has a larger diameter than that of the hollow of the nozzle at any portion thereof. This hollow fiber filter module can advantageously be used in the so-called external pressure type filtration on a large scale. By the use of this filter module, the external pressure type filtration of a liquid can advantageously be stably performed for a prolonged period of time with a high filtration efficiency.

6 Claims, 5 Drawing Sheets

HOLLOW FIBER FILTER MODULE

BACKGROUND OF THE INVENTION

1. Field of The Invention

The present invention relates to a hollow fiber filter module. More particularly, the present invention is concerned with a hollow fiber filter module comprising a casing having a liquid introducing nozzle at least at one end portion thereof and having a bundle of hollow fibers disposed in the casing, and wherein one end portion of the bundle is enclosed by a hollow, liquid flow control member, and the liquid introducing nozzle has an inlet opening which has a larger diameter than that of the hollow of the nozzle at any portion thereof. The hollow fiber filter module can advantageously be used for separation-purification of liquids, especially in filtration in which a liquid to be filtered is brought into contact with the outer wall surface of a hollow fiber membrane and a filtrate is withdrawn from the inner wall surface of the hollow fiber membrane, i.e., so-called external pressure type filtration. By the use of the filter module of the present invention, the external pressure type filtration of the liquid can advantageously be stably performed for a prolonged period of time with a high filtration efficiency.

2. Discussion of Related Art

When a hollow fiber filter module to be used in the internal pressure type filtration (i.e., filtration in which a liquid to be filtered is brought into contact with the inner wall surface of a hollow fiber membrane and a filtrate is withdrawn from the outer wall surface of the membrane) is used in the external pressure type filtration without any modification of the structure of the internal pressure type filtration module, various problems occur. Particularly, when a filter module comprising a cylindrical casing having a liquid introducing nozzle at one end portion of the casing in its periphery and having a bundle of hollow fibers disposed in the casing along the length thereof is used in the external pressure type filtration without any modification of the structure of the internal pressure type filtration module, problems occur such that the hollow fibers in the bundle are pressed against each other, at a portion of the bundle corresponding to the position of the liquid introducing nozzle, under the great force of a liquid to be filtered flowing into the module through the liquid introducing nozzle, so that the liquid cannot be effectively brought into contract with the hollow fibers which are present within the bundle. Further, the hollow fibers are likely to be broken or otherwise damaged under the force of the liquid to be filtered flowing into the module through the liquid introducing nozzle. These problems are particularly serious when the filter module is relatively large and hence the flow rate of the liquid to be filtered is large. To solve these problems, various proposals have been made. In one proposal, the bundle of hollow fibers is wrapped in a net of a synthetic resin. In another proposal, a baffle plate is disposed between the liquid introducing nozzle and the hollow fiber bundle. In a further proposal, a cylindrical barrier is disposed around the hollow fiber bundle at a portion thereof corresponding to the position of the liquid introducing nozzle.

However, particularly, in the above-mentioned proposals in which a baffle plate or a cylindrical barrier is used, a loss is caused in the pressure to be exerted against the hollow fibers by the liquid introduced through the liquid introducing nozzle, so that the filtration efficiency of the module becomes unsatisfactory. Further, the above-mentioned proposals have a disadvantage in that the module suffers from a lowering of filtration efficiency at the early stage of the operation, depending on the type of the liquid to be filtered. The exact reason for the lowering of the filtration efficiency at the early stage has not yet been elucidated. However, it is presumed that in the modules of the above-mentioned proposals, there is irregularity in the flow rate of the liquid in the circumferential direction so that an accumulation of impurity particles on the outer wall surfaces of the hollow fibers progresses at portions where the flow rate is low. Thus, in the art, there is a strong demand for a hollow fiber filter module which can advantageously be used in the external pressure type filtration without the above-mentioned problems.

SUMMARY OF THE INVENTION

With a view toward developing a hollow fiber filter module free from the above-mentioned drawbacks inevitably accompanying the conventional filter modules, the present inventors have conducted extensive and intensive studies. As a result, it has unexpectedly been found that this goal can be attained by a filter module provided with a hollow, liquid flow control member and a liquid introducing nozzle having a specific unique structure. Based on this novel finding, the present invention has been completed.

It is, therefore, an object of the present invention to provide a hollow fiber filter module which can advantageously be used in the external pressure type filtration, in which a loss is minimized in the pressure of a liquid introduced into the module even at high flow rates, and in which a lowering in filtration efficiency with time is minimized.

The foregoing and other objects, features and advantages of the present invention will be apparent to those skilled in the art from the following detailed description and appended claims taken in connection with the accompanying drawings.

BRIEF DESCRIPTION OF THE DRAWINGS

In the drawings:

In FIGS. 1 through 9, like parts or portions are designated by like numerals or characters.

DETAILED DESCRIPTION OF THE INVENTION

In one aspect of the present invention, there is provided a hollow fiber filter module comprising:

a substantially cylindrical casing having a liquid introducing nozzle at least at one end portion of the cylindrical casing in its periphery and having a bundle of porous hollow fibers disposed in the cylindrical casing along the length of the cylindrical casing, each porous hollow fiber having an opening in at least one end of the fiber, the bundle of hollow fibers being connected at both ends thereof to end portions of the cylindrical casing, the bundle of porous hollow fibers being enclosed at one end portion of the bundle corresponding to the end portion having the liquid introducing nozzle by a hollow, liquid flow control member securely provided in the cylindrical casing, the liquid flow control member being positioned so as to provide a spacing between the outer surface of the control member and the inner surface of the cylindrical casing, the liquid introducing nozzle comprising an outer opening, an inlet opening in the peripheral wall of the cylindrical casing and a nozzle wall stemming from the circumference of the inlet opening in the peripheral wall of the cylindrical casing to the outer opening and having an extended hollow which is defined by the inner surface of the nozzle wall extending from the outer opening toward the inlet opening, the inlet opening having a larger diameter than that of the hollow at any portion thereof, inclusive of the outer opening, the diameter of the inlet opening being defined as a diameter measured across the openinng at the inner wall surface of the cylindrical casing.

The present invention will now be described in detail with reference to the accompanying drawings.

Figure 1:
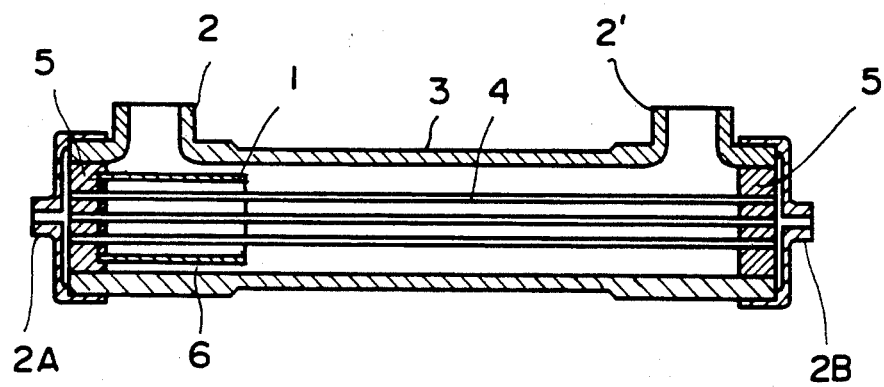
FIG. 1 is a dragrammatic longitudinal cross-sectional view of one form of the hollow fiber filter module according to the present invention.

Referring now to FIG. 1, there is shown a diagrammatic view showing a longitudinal cross-section of one embodiment of the hollow fiber filter module of the present invention. A substantially cylindrical casing 3 has a liquid introducing nozzle 2 at least at one end portion of the cylindrical casing in its periphery and has a bundle of porous hollow fibers 4 disposed in the cylindrical casing 3 along the length of the cylindrical casing 3. Each porous hollow fiber 4 has an opening in at least one end of the fiber. The bundle of hollow fibers 4 is connected at both ends thereof to end portions of the cylindrical casing 3 by means of a fixation block 5 which is, for example, of an epoxy resin and serves to not only bond the hollow fibers 4 together but also connect the both ends of the hollow fibers 4 to the end portion of the casing 3.

The cylindrical casing 3 may optionally have a liquid withdrawing nozzle 2' which is effective for controlling the liquid pressure of further decrease the danger of breakage of the hollow fibers in the cylindrical casing 3.

The bundle of porous hollow fibers 4 is enclosed at one end portion of the bundle corresponding to the end portion having the liquid introducing nozzle 2 by a hollow, liquid flow control member 1 securely provided in the cylindrical casing 3. The liquid flow control member 1 is positioned so as to provide a spacing 6 between the outer surface of the control member 1 and the inner surface of the cylindrical casing 3.

The liquid introducing nozzle 2 comprises an outer opening, an inlet opening in the peripheral wall of the cylindrical casing 3 and a nozzle wall stemming from the circumference of the inlet opening in the peripheral wall of the cylindrical casing 3 to the outer opening and has an extended hollow which is defined by the inner surface of the nozzle wall extending from the outer opening toward the inlet opening. The inlet opening has a larger diameter than that of the hollow at any portion thereof, inclusive of the outer opening. The diameter of the inlet opening is defined as a diameter measured across the opening at the inner wall surface of the cylindrical casing 3.

It is preferred that the diameter of the hollow of the liquid introducing nozzle 2 continuously decrease over a distance of at least 5% of the nozzle wall, based on the entire length of the nozzle wall, from the inlet opening toward the outer opening.

The shape of the hollow of the liquid introducing nozzle 2 may be circular, polygonal or irregular in cross-section, but a circular shape in cross-section is preferred.

With respect to the structure of the liquid withdrawing nozzle 2' (optional), there is no limitation. However, from the viewpoint of reduction of resistance to a liquid flow withdrawn therethrough, the liquid withdrawing nozzle 2' preferably have a structure which is identical to that of the liquid introducing nozzle 2 defined in the present invention.

Figure 2:
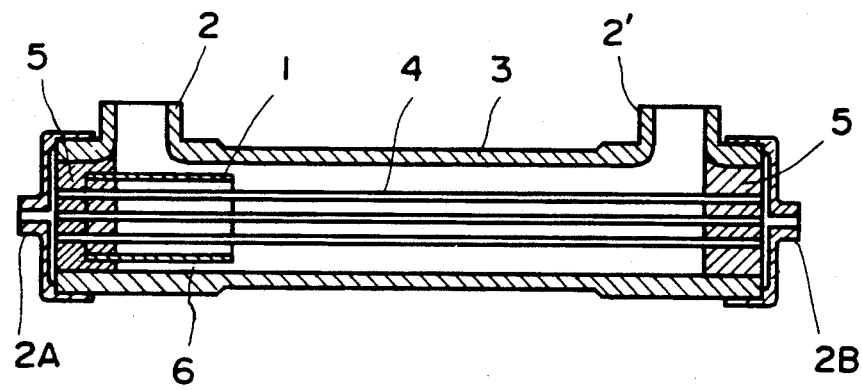
FIG. 2 is a diagrammatic longitudinal cross-sectional view of another form of the hollow fiber filter module according to the present invention.

In FIG. 2, there is shown a diagrammatic view showing a longitudinal cross-section of another form of the hollow fiber filter module of the present invention. In the filter module of FIG. 2, the length, in the longitudinal direction of a cylindrical casing 3, of a fixation block 5 which bonds together the end portions of the hollow fibers and is attached at its periphery to the inner wall surface of the casing 3, is longer than in the case of the module of FIG. 1, so that the exposed inner surface of the fixation block 5 defining the effective length of each hollow fiber 4 of the filter module is in alignment with the inner wall surface of each of a liquid introducing nozzle 2 and a liquid withdrawing nozzle 2'. In this form of the filter module, stagnation of a liquid in the end portions of the inside of the module can be prevented, thereby making the accumulation of impurities and the proliferation of bacteria less likely.

Figure 3:
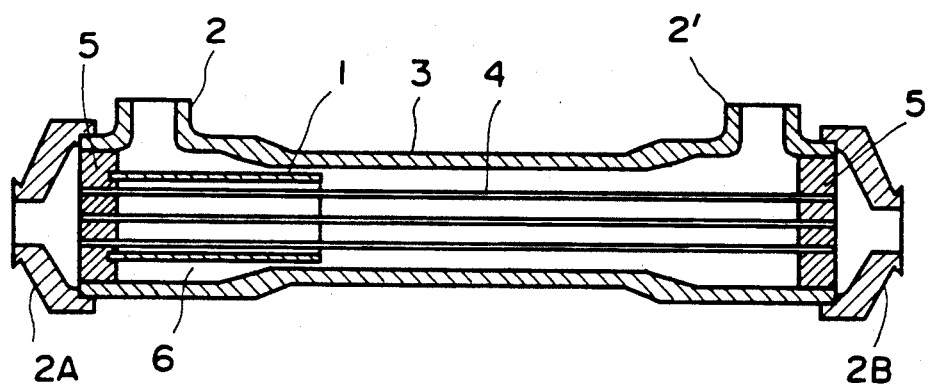
FIG. 3 and FIG. 4 are diagrammatic longitudinal cross-sectional views of more preferred forms of the hollow fiber filter module according to the present invention.
Figure 4:
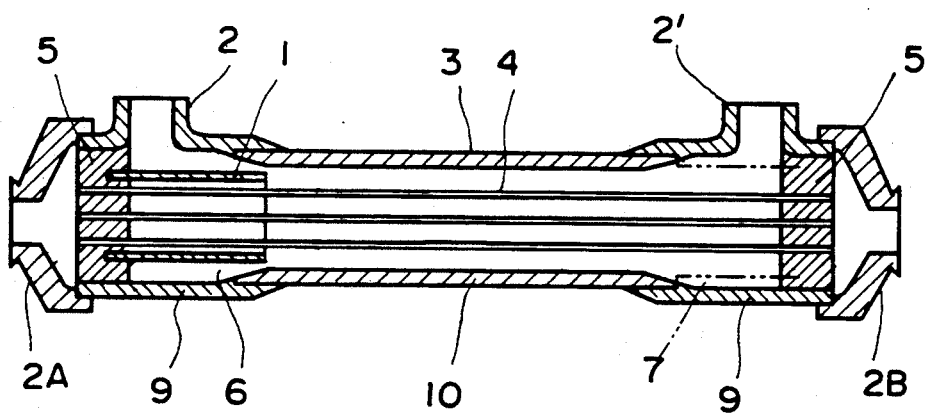
Figure 8:
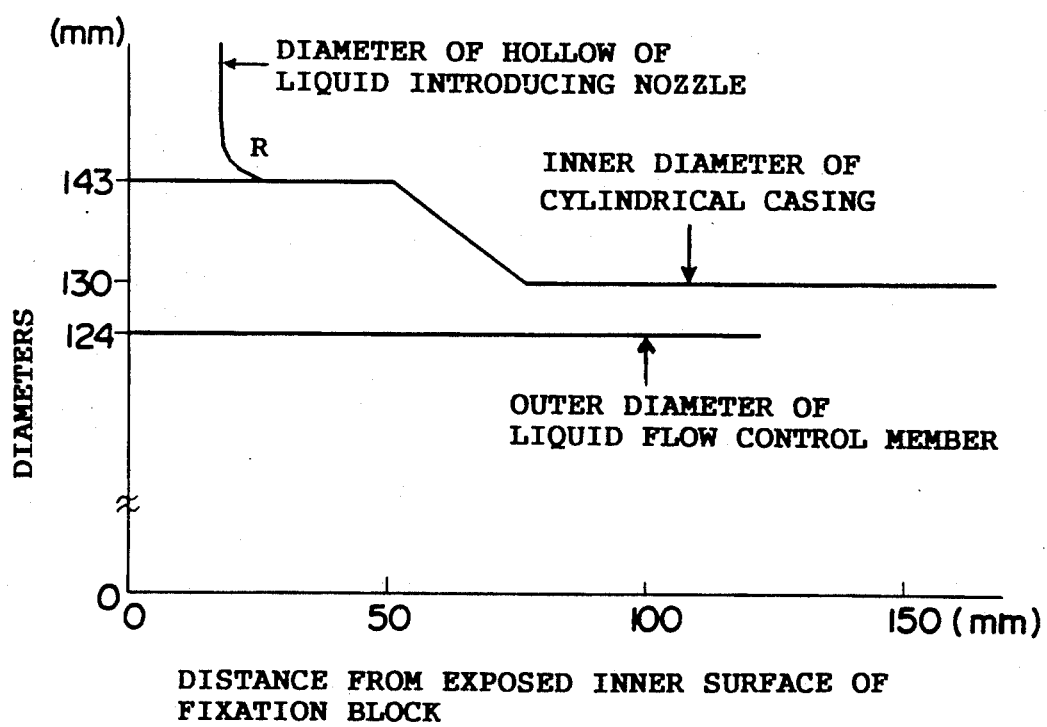
FIG. 8 is a graph showing a manner of change in the inner diameter of the cylindrical casing used in a more preferred embodiment of the hollow fiber filter module of the present invention, together with a manner of change in the diameter of the hollow of the liquid introducing nozzle and an example of the outer diameter of the liquid flow control member.
Figure 9:
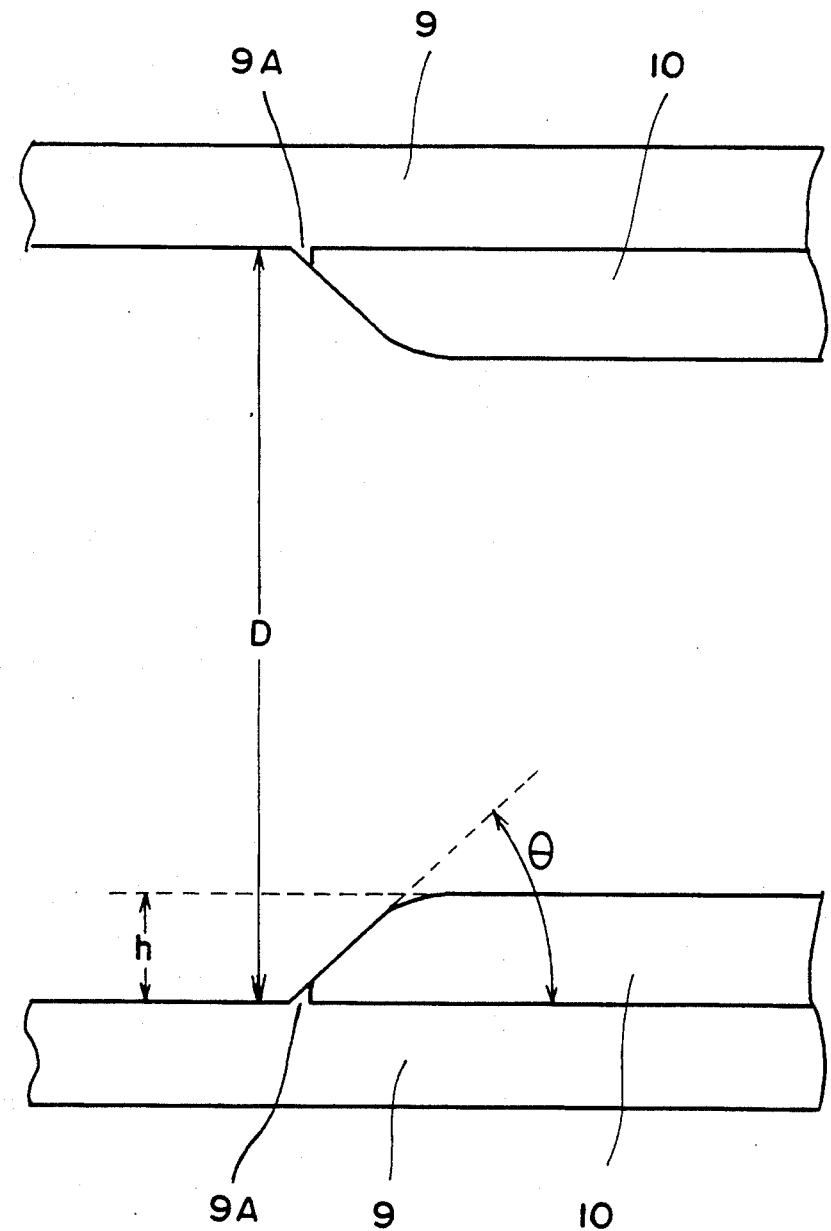
FIG. 9 is a diagrammatic view showing an enlarged longitudinal cross-section of a portion of a cylindrical casing, in which the inner wall surface of the cylindrical casing has a tapered cross-section portion which is tapered at an angle ($\theta$).

In FIG. 3, there is shown a diagrammatic view showing a longitudinal cross-section of a more preferred form of the hollow fiber filter module of the present invention. In the filter module of FIG. 3, the inner wall surface of the cylindrical casing 3 has at its portion extending from the end portion containing the control member 1 toward a central portion of the casing 3 and facing the control member 1 a tapered cross-section portion such that the inner diameter of the cylindrical casing 3 becomes small toward the central portion (as shown in FIG. 8). In this filter module, there is no step-like projection on the inner surface of the casing 3. The terminology "steplike projection" used herein means a projection producing a state in which the inner wall surface of the casing 3 has a tapered cross-section portion which is tapered at an angle ($\theta$) as shown in FIG. 9, wherein the angle ($\theta$) is larger than 45° and the height ("h" in FIG. 9) of the projected portion is 1% or more of the inner diameter ("D" in FIG. 9) of the casing 3. FIG. 9 shows a longitudinal cross-section of a tapered cross-section portion of an assembly type cylindrical casing 3 as shown in FIG. 4 which comprises a segment 9 having a nozzle 2 (not shown) and a cylindrical pipe segment 10 which segments 9 and 10 are bonded to each other. In the present invention, the cylindrical casing 3 may be formed integrally (as depicted in FIGS. 1–3. Alternatively, as shown in FIG. 4 and described later in detail, the cylindrical casing 3 may comprise separate segments 9 and 10 which are connected to each other (see FIGS. 4 and 9).

The angle ($\theta$) of the gradient of the tapered cross-section portion is preferably in the range of not greater than 45°, more preferably 5° to 30°. The percentage of the maximum decrease in inner diameter relative to the inner diameter of the end portion of the casing 3 corresponding to the position where a liquid flow control member 1 is disposed, is preferably 5% to less than 20%. When the maximum decrease is less than 5%, it is likely to be difficult to attain a uniform flow in the circumferential direction of the liquid control member 1 of a liquid introduced into the module as that the filtration efficiency lowering with time is likely to be unfavorably large. On the other hand, when the maximum decrease in inner diameter is 20% or more, the number of hollow fibers which can be disposed in the module becomes too small so that the filtration efficiency per unit volume of the module is likely to be unfavorably low.

In FIG. 4, there is shown another more preferred form of the hollow fiber filter module of the present invention. In the filter module of FIG. 4, the cylindrical casing 3 comprises a cylindrical pipe segment 10 and nozzle-having segments 9, 9 connectd to end portions of the pipe segment 10, respectively by adhesive-bonding or welding. Illustratively stated, the outer diameter of the pipe segment 10 is approximately equal to the inner diameter of the cylindrical end portion of the nozzle-having segment 9. The end portion of the pipe segment 10 is inserted in the cylindrical end portion of the nozzle-having segment 9 so that the inner wall surface of the cylindrical end portion of the nozzle-having segment 9 is fitted over and connected to the outer wall surface of the end portion of the pipe segment 10 as depicted in FIG. 4. The inserted end portion of the pipe segment 10 has an end tapered in cross-section so as to provide a tapered cross-section portion on the inner wall surface of the cylindrical casing 3 in the filter module of the present invention. This tapered cross-section portion produced by the connection of the pipe segment 10 with the nozzle-having segment 9 is illustrated in FIG. 9 in enlarged fashion. In FIG. 9 the tip end of the tapered cross-section portion of the inserted pipe segment 10 is cut-out to have a vertical section abutting against a vertical face of a wedge 9A of the nozzle-having segment 9. With this abutment structure, the connection between the nozzle-having segment 9 and the pipe segment 10 is advantageously strengthened to provide a strong peeling resistance. However, the abutment structure may be omitted. When the abutment structure is omitted, the tapered cross-section portion of the inserted pipe segment 10 is tapered to a tip end thereof and the nozzle-having segment 9 has no wedge 9A.

The tapered cross-section portion is tapered at an angle ($\theta$) as depicted in FIG. 9. As described above, the angle ($\theta$) is preferably not greater than 45°, more preferably in the range of 5° to 30°.

In the filter module of FIG. 4, the length, in the longitudinal direction of the cylindrical casing 3, of a fixation block 5 which bonds together the end portions of the hollow fibers, is longer than in the case of the module of FIG. 3 so that the inner exposed surface of the fixation block 5 defining the effective length of the each hollow fiber 4 of the filter module is in alignment with the inner wall surface of each of a liquid introducing nozzle 2 and a liquid withdrawing nozzle 2', as in the case of the module of FIG. 2. In this form of the filter module, stagnation of a liquid in the end portions of the inside of the module can be prevented, thereby making the accumulation of impurities and the proliferation of bacteria less likely. Further, the module has a hollow fiber protector 7 (depicted with imaginary lines) which is closely disposed so as to enclose the end portion of the bundle on the side of a liquid withdrawing nozzle 2'. The hollow fiber protector 7 generally has a cylindrical form and is made of a porous material. The material for the protector 7 is not limited and may be the same as used for the casing 3 and/or the control member 1.

In operation of the filter module of the present invention which is typically illustrated in FIGS. 1–4, a liquid introduced into the filter module of the present invention through the liquid introducing nozzle 2 hits against the liquid flow control member 1 and enters the annular space 6 around the liquid flow control member 1. The flow of the liquid is thus rectified by the liquid flow control member 1 and then, the liquid is brought into contact with the hollow fibers 4. A part (about one tenth) of the liquid introduced into the module is withdrawn through the liquid withdrawing nozzle 2' which is optionally provided. The liquid enters the porous wall of each hollow fiber 4 from the outer wall surface thereof and passes through the porous wall to enter the hollow space of each fiber. During the passage of the liquid through the porous wall of each hollow fiber, any impurities in the liquid are removed. A filtrate collected in the hollow space of each fiber is withdrawn through at least one of filtrate withdrawing outlets of headers 2A, 2B which are fitted over the end of the hollow fibers.

Figure 7:
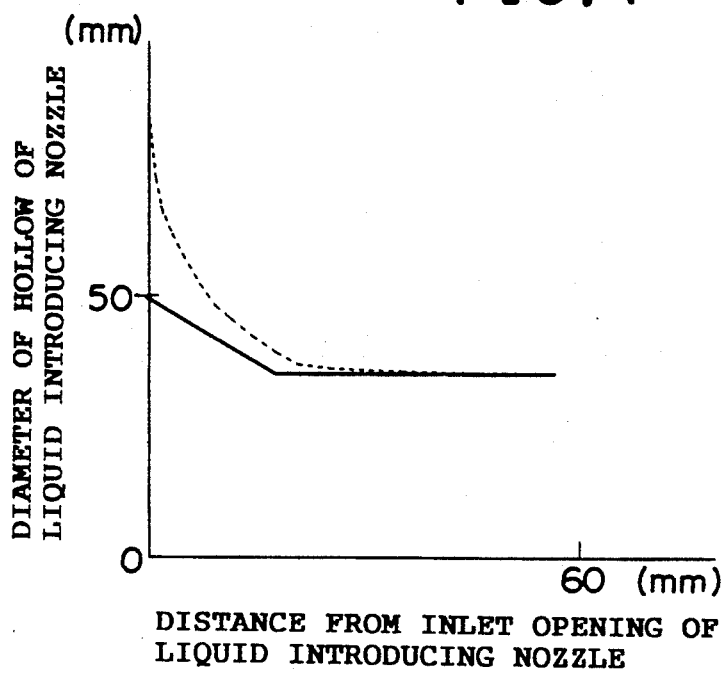
FIG. 7 is a graph showing two manners of change in the diameter of the hollow of the liquid introducing nozzle provided in the periphery of the hollow fiber filter module of the invention.

In the present invention, the diameter of the hollow of the liquid introducing nozzle 2 continuously decreases over a distance of at least 5% of the nozzle wall, based of the entire length of the nozzle wall, from its inlet opening toward its outer opening. The diameter of the inlet opening is generally 105 to 300%, preferably 110 to 200%, more preferably 110 to 150%, relative to the diameter of the hollow of the liquid introducing nozzle 2 at a distance of 5% of the nozzle wall from the inlet opening toward the outer opening. The manner of the increase in the inner diameter of the liquid introducing nozzle may be linear or curved (as respectively indicated by the solid line and the broken line in FIG. 7). However, it is preferred that the manner of the increase in the inner diameter be curved. It is most preferred that the manner of the increase in the inner diameter be curved so that the lower end of a longitudinal cross-section of the liquid introducing nozzle 2 is rounded to exhibit a curvature having a radius (R) as depicted in FIGS. 1 to 4. In FIG. 7, there are shown two preferred manners of the increase in the inner diameter of the liquid introducing nozzle 2.

By virtue of this structure of the liquid introducing nozzle 2, the resistance to the liquid in the liquid introducing nozzle 2 is held down to a minimum so that the pressure of the liquid can be effectively exerted on the hollow fibers.

With respect to the material for the liquid flow control member 1, there is no particular limitation as long as the material has a satisfactory strength and resistance to a solvent. Examples of materials usable for the flow control member 1 include those (described later) useful for the cylindrical casing 3, such as polyvinyl chloride, polysulfone, polyethylene and polypropylene. The liquid flow control member 1 may be a molded article produced from any one of these plastics. The shape of the liquid flow control member 1 may be either circular or polygonal in cross-section, but a circular shape in cross-section is preferred.

The outer diameter of the liquid flow control member 1 is not particularly limited, but is preferably in the range of about 50 to about 98% of the inner diameter of the casing 3. When the outer diameter of the liquid flow control member 1 is larger than 98% of the inner diameter of the casing 3, the pressure loss in the liquid introduced into the module is too large so that the filtration efficiency is lowered. On the other hand, when the outer diameter of the liquid flow control member 1 is smaller than 50% of the inner diameter of the casing 3, the number of hollow fibers which can be disposed in the module is too small so that the filtration efficiency per unit volume of the module becomes low.

The length of the liquid flow control member 1 is not particularly limited, but is preferably about 3 to about 30%, more preferably about 10 to 20% of the length of the hollow fibers disposed in the module. When the length of the liquid flow control member 1 is less than 3% of the length of the hollow fibers, the flow controlling effect is small so that the filtration efficiency is lowered and that there is a danger of breakage of the hollow fibers. When the length of the liquid flow control member is larger than 30% of the length of the hollow fibers, it is likely that the filtration efficiency is lowered.

Figure 5:
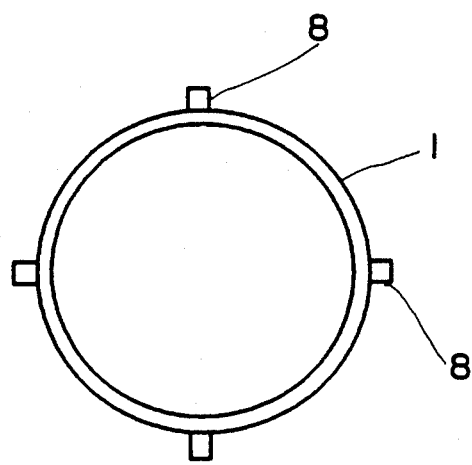
FIG. 5 is a diagrammatic, explanatory view of one form of the hollow, liquid flow control member used in the hollow fiber filter module of the present invention, as viewed in the direction of the hollow of the control member.
Figure 6:
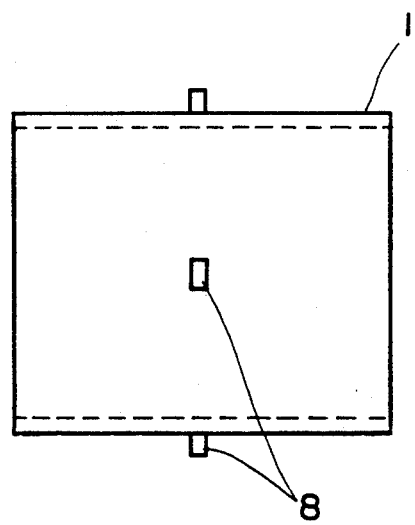
FIG. 6 is a diagrammatic side view of the hollow, liquid flow control member shown in FIG. 5.

To attain secure provision of the liquid flow control member 1, the liquid flow control member 1 may have a perforated structure in its portion to be embedded in the fixation block 5. Alternatively, the liquid flow control member 1 may have supports 8 on its periphery in its portion to be exposed to the annular spacing 6, which are rested on the inner wall surface of the casing 3 to support the control member 1 (see FIGS. 5 and 6). Further, the liquid flow control member 1 may have a perforated structure to allow the passage of a liquid therethrough. In the perforated structure, holes are formed in the peripheral wall of the control member 1 on lines in opposite relationship approximately along the length of the control member 1, which lines are on an imaginary plane intersecting the central axis and peripheral wall of the control member 1 at right angles with the longitudinal axis of the liquid introducing nozzle 2.

As described above with reference to FIGS. 3 and 4, in a more preferred embodiment of the present invention, the inner wall surface of the cylindrical casing 3 hs at its portion extending from the end portion containing the control member 1 toward a central portion of the casing 3 and facing the control member 1 a tapered cross-section portion such that the inner diameter of the cylindrical casing 3 becomes small toward the central portion. The tapered cross-section is tapered at an angle ($\theta$) of preferably not greater than 45°, more preferably not greater than 30° as mentioned above.

In the more preferred embodiment of the present invention, when the module has only one liquid introducing nozzle 2, the inner wall surface of the cylindrical casing 3 on the side thereof having no control member 1 may or may not have a tapered cross-section portion such that the inner diameter of the cylindrical casing 3 becomes small toward the central portion. However, particularly when the module has a liquid withdrawing nozzle 2′, it is preferred to provide a tapered cross-section portion in the inner wall surface of the casing 3 on the side having the liquid withdrawing nozzle 2′ (as depicted in FIGS. 3 and 4) from the viewpoint of reduction of resistance to a liquid flow and reduction of adverse effect (pulling force toward the liquid withdrawing nozzle 2′) on the fibers.

With respect to the material for the cylindrical casing 3, there is no particular limitation as long as the material has satisfactory molding properties, strength and resistance to a solvent. Representative examples of such materials include polyvinyl chloride, polycarbonate, polysulfone, a tetrafluoroethylene-perfluoroalkyl vinyl ether copolymer, polyethylene, polypropylene, polyether ether ketone, and polyvinylidene fluoride.

The porous hollow fiber 4 used in the filter module of the present invention is not particularly limited, and any conventional hollow fiber can be employed. Preferred examples of hollow fibers include those made of a thermoplastic resin, such as polysulfone. With respect to the details of a hollow fiber, reference can be made to U.S. Pat. Nos. 4,351,860, 4,286,015 and 4,822,489.

The hollow fiber filter module of the present invention can advantageously be used for the purification of liquids on a large scale. Therefore, the module of the present invention generally has a large size. For constructing a large size module, it is prefferred for the module of the present invention to have an assembly structure in which the cylindrical casing comprises (a) a segment having the nozzle and (b) a cylindrical pipe segment which is separated from the segment (a), the segments (a) and (b) being connected to each other by adhesive-bonding or welding, as depicted in FIG. 4. In such an assembly structure, the tapered cross-section configuration of the inner wall surface of the cylindrical casing 3 is particularly effective for attaining the object of the present invention. In conventional filter modules of a type in which the cylindrical casing comprises (a) at least one segment having a nozzle and (b) a cylindrical pipe segment which is separated from the segment (a), the segments (a) and (b) being connected to each other by adhesive-bonding or welding, there is a steplike projection defined before in the connecting portions of the inner wall surface of the casing, which steplike projection produces resistance to the flow of a liquid and causes adverse channeling in the flow. This problem is skillfully eliminated by the tapered cross-section configuration of connecting portion in the inner wall surface of the cylindrical casing 3.

It is also preferred that the connecting portions of the outer surface of the cylindrical casing 3 have no steplike projection. When the connecting portions on the outer surface of the casing have a steplike projection, if a solvent sticks to the connecting portions, it is likely that the solvent is not completely removed even after washing. Thus, there is a danger such that the remaining solvent lowers the mechanical strength of the casing over a long period of time. The "no steplike projection" configuration of the outer surface of the casing 3 means a configuration such that even when a steplike projection rising with a gradient of 45° or more is formed on the outer surface of the casing 3 at the connecting portion between the nozzle-having segment 9 and the cylindrical pipe segment 10, the height of the steplike projection is not larger than 100%, preferably not larger than 60% of the wall thickness of the cylindrical pipe segment.

The filter module of the present invention exhibits markedly excellent effect particularly when it is used at high liquid flow rate. Generally, at high liquid flow rate, the linear velocity of a liquid in the liquid introducing nozzle is 0.5 m/second or more. The effect of the present invention is extremely excellent particularly when the linear velocity in the liquid introducing nozzle is 1.0 m/second or more.

As described above, the hollow fiber filter module of the present invention is suitable for use in the external pressure type filtration. It should however be noted that the filter module of the present invention can also advantageously be employed in the internal pressure type filtration when the filter module is required to be periodically back-washed with a washing liquid. In the case of the use in the internal pressure type filtration, the liquid introducing nozzle is used as an outlet for a filtrate. The back-washing liquid is introduced into the module through the liquid introudcing nozzle (which has been used as an outlet for filtrate). Thus, the pressure loss of the back-washing liquid is minimized so that the effect of the back-washing is greatly increased without any adverse effect on the hollow fibers.

The exact reason why the filter module of the present invention exhibits an excellent effect has not yet been elucidated. However, the following assumptions can be made. Since in the filter module of the present invention, the pressure loss of a liquid introduced through the liquid introducing nozzle is minimized and the inner surface of the casing 3 has substantially no steplike projection, a uniform, high liquid flow rate along the inner surface of the casing can be attained with a minimum resistance to the flow. Due to the high flow rate, the bundle of the hollow fibers is radially expanded and thus the interstices between the hollow fibers is increased, so that the pressure of the liquid is effectively exerted on the hollow fibers throughout the entire thickness of the bundle. This effect is extremely excellent in the case of the embodiment in which the inner wall surface of the casing 3 has a tapered cross-section portion such that the inner diameter of the casing becomes small toward the central portion. In addition, in the filter module of the present invention, a liquid flow in the longitudinal direction which is uniform in the circumferential direction can be attained, thereby reducing the burden on the hollow fibers so that breakage of the hollow fibers is prevented and that accumulation of impurities on the fibers due to stagnation is prevented. Thus, a filtration efficiency which is stable for a prolonged period of time is attained.

The hollow fiber filter module of the present invention can advantageously be used for separation-purification of liquids, especially in the external pressure type filtration. The hollow fiber filter module of the present invention is particularly useful in the filtration of water on a large scale. Representative examples of uses of the filter module of the present invention include production of ultrapure water for washing semiconductors and purification of water in water treatment facilitates. By the use of the filter module of the present invention, the external pressure type filtration of a liquid can advantageously be stably performed for a prolonged period of time with a minimized loss in the pressure of a liquid introduced into the module even at high flow rates and with a minimized lowering in filtration efficiency with time.

PREFERRED EMBODIMENT OF THE INVENTION

The present invention will be described in more detail with reference to the Examples, which should not be construed to be limiting the scope of the present invention.

Example 1

A hollow fiber filter module as shown i n FIG. 4, from both ends of which an ultrafiltrate is adapted to be collected, is assembled. The module is comprised of (i) cylindridal polysulfone casing 3 having liquid introducing nozzle 2 at one end portion of the cylindrical casing 3 and having liquid withdrawing nozzle 2' at the other end portion of the cylindrical casing 3, (ii) a bundle of 7,200 polysulfone hollow fibers 4 adapted for ultrafiltration, each having an inner diameter of 0.65 mm and an outer diameter of 1.10 mm, and exhibiting a pure water permeability of 1.35 liters/hr kg/cm$^2$. m at 25° C., and (iii) cylindrical polypropylene hollow, liquid flow control tube 1 having an outer diameter of 124 mm. The bundle of fibers 4 is disposed in the cylindrical casing 3 along the length thereof, and fluid-tightly secured at both of its end portions to epoxy resin fixation blocks 5, 5 fluid-tightly inserted in end portions of the cylindrical casing 3. The tube 1 is disposed so as to enclose one end portion of the bundle of polysuylfone hollow fibers 4 and is secured at its end portion to one of the epoxy resin fixation blocks 5, 5 while ensuring an effective tube length (length of a portion of the tube 1, which portion is not embedded in the epoxy resin fixation block 5) of 130 mm. The effective hollow fiber length (length of a portion of a hollow fiber, which portion is not embedded in the epoxy resin fixation blocks 5, 5) of the hollow fibers 4 is 930 mm.

Each of the nozzles 2, 2' comprises an outer opening, an inlet opening in the peripheral wall of the cylindrical casing and a cylindrical nozzle wall stemming fromn the circumfrence of the inlet opening in the peripheral wall of the cylindrical casing to the outer opening and has an extended cylindrical hollow which is defined by the inner surface of the nozzle wall extending from the outer opening toward the inlet opening. The cylindrical hollow has a diameter of 33 mm everywhere but at the lower inner end portion of the nozzle wall near the inlet opening. The lower inner end portion of the nozzle wall has been rounded to assume a radius of curvature of 5 mm, so that the inlet opening of the nozzle has a larger diameter than that of the cylindrical hollow. The inner diameter of the casing 3 is 143 mm at both end portions thereof and decreased to a minimum of 130 mm over a length of 28 mm at a region where nozzle-having segment 9 and cylindrical pipe segment 10 are connected to each other. Thus, the inner wall surface of the cylindrical casing has a tapered cross-section portion in which the tapered cross-section is tapered at an angle ($\theta$) of approximately 13°.

In the fabrication of the casing 3, the nozzle-having segment 9 and the cylindrical pipe segment 10 provided with no nozzle and having a wall thickness of 5 mm are separately prepared and connected to each other by means of an adhesive to thereby obtain the casing 3. The inner surface of the pipe segment 10 is tapered as shown in FIG. 4 to attain the above-mentioned inner diameter change for the casing 3 without providing a substantially steplike projection.

Pure water of 25° C. is fed through the nozle 2 into the nodule at a rate of 9.5 m$^3$/hr, and filtration-residual water is withdrawn as a concentrated liquid through the nozzle 2' at a rate of 0.5 m$^3$/hr, thereby effecting ultrafiltration at a rate of 9.0 m$^3$/hr.

The pressure required for the ultrafiltration as defined below is 1.00 kg/cm$^2$ at the time of 5 minutes from the stat of water feeding, and is 1.01 kg/cm$^2$ after 200 hours of continuous ultrafiltration. No breakage of hollow fibers is observed after 200 hours of continuous ultrafiltration.

The pressure required for the ultrafiltration is defined by the formula:

$$P = \frac{P_i + P_o}{2} - \frac{Pf_1 + Pf_2}{2} \; (kg/cm^2)$$

wherein $P_i$ represents the pressure (kg/cm$^2$) at the inlet of fed water, i.e., at hollow of nozzle 2; $P_o$ represents the pressure (kg/cm$^2$) at the outlet of fed water, i.e., at hollow of nozzle 2'; $Pf_1$ represents the pressure (kg/cm$^2$) at a filtrate withdrawing outlet of header 2A; and $Pf_2$ represents the pressure (kg/cm$^2$) at a filtrate withdrawing outlet of header 2B.

EXAMPLE 2

Substantially the same procedure as described in Example 1 is repeated except that the rounding of the pipe segment 10 is not carried out so that a steplike projection of 5 mm (i.e., 3.6% of the inner diameter of the casing 3) having a gradient of 90° exists on the inner surface of the casing 3, at a region where the nozzle-having segment 9 and the pipe segment 10 are connected to each other.

With respect to the ultrafiltration performance at a rate of 9.0 m$^3$/hr, the required pressure is 1.03 kg/cm$^2$ at the time of 5 minutes from the start of the ultrafiltration, and is 1.10 kg/cm$^2$ after 200 hours of continuous ultrafiltration. No breakage of hollow fibers is observed after 200 hours of continuous ultrafiltration.

EXAMPLE 3

A hollow fiber filter module as shown in FIG. 1, from both ends of which an ultrafiltrate is adapted to be collected, is assembled. The module is comprised of (i) cylindrical polysulfone casing 3 having liquid introducing nozzle 2 at one end portion of the cylindrical casing 3 and having liquid withdrawing nozzle 2' at the other end portion of the cylindrical casing 3, which casing 3 has inner diameter of 130 mm unchanged along the axis of the casing 3, (ii) a bundle of 7,200 polysulfone hollow fibers 4 adapted for ultrafiltration, each having an inner diameter of 0.65 mm and an outer diameter of 1.10 mm, and exhibiting a pure water permeability of 1.35 liters/hr kg/cm$^2$.m at 25° C., and (iii) cylindrical polypropylene hollow, liquid flow control tube 1 having an outer diameter of 124 mm. The bundle of fibers 4 is disposed in the cylindrical casing 3 along the length thereof, and fluid-tightly secured at both of its end porítons to epoxy resin fixation blocks 5, 5 fluid-tightly inserted in end portions of the cylindrical casing 3. The tube 1 is disposed fo as to enclose one end portion of the bundle of polysulfone hollow fibers 4 and is secured at its end portion to one of the epoxy resin fixation blocks 5, 5 while ensuring an effective tube length (length of a portion of the tube 1, which portion is not embedded in the epoxy resin fixation block 5) of 180 mm. The effective hollow fiber length (length of a portion of a hollow fiber, which portion is not embedded in the epoxy resin fixation blocks 5, 5) of the hollow fibers 4 is 930 mm.

Each of the nozzles 2, 2' comprises an outer opening, an inlet opening in the peripheal wall of the cylindrical casing and a cylindrical nozzle wall stemming from the circumference of the inlet opening in the peripheral wall of the cylindrical casing to the outer opening and has an extended cylindrical hollow which is defined by the inner surface of the nozzle wall extending from the outer opening toward the inlet opening. The cylindrical hollow has a diameter of 33 mm every where but at the lower inner end portion of the nozzle wall near the inlet opening. The lower inner end portion of the nozzle wall has been rounded to assume a radius of curvature of 5 mm, so that the inlet opening of the nozzle has a larger diameter than that of the cylindrical hollow. In this Example, the tapering as provided in Example 1 for the cylindrical casing 3 is not provided.

Pure water of 25° C. is fed through the nozzle 2 into the module at a rate of 9.5 m$^3$/hr, and filtration-residual water is withdrawn as a concentrated liquid through the nozzle 2' at a rate of 0.5 m$^3$/hr, thereby effecting ultrafiltration at a rate of 9.0 m$^3$/hr.

The pressure required for the ultrafiltration is 1.00 kg/cm$^2$ at the time of 5 minutes from the start of water feeding, and is 1.10 kg /cm$^2$ after 200 hours of continuous ultrafiltration. Nl breakage of hollow fibers is observed after 200 hours of continuous ultrafiltration.

EXAMPLE 4

Substantially the same procedure as described in Example 3 is repeated except that in the fabrication of the casing 3, nozzle-having segment 9 and cylindrical pipe segment 10 are separately prepared and connected to each other, and that the inner surface of the pipe segment 10 is tapered so that the inner diameter of the casing 3 is 143 mm at both end portions thereof and decreased to a minimum of 130 mm over a length of 14 mm at a region where the nozzle-having segment 9 and the cylindrical pipe segment 10 are connected to each other. Thus, the inner wall surface of the cylindrical casing has a tapered cross-section portion in which the tapered cross-section is tapered at an angle ($\theta$) of approximately 25°.

Pure water of 25° C. is fed through the nozzle 2 into the module at a rate of 9.5 m$^3$/hr, thereby effecting ultrafiltration at a rate of 9.0 m$^3$/hr.

The pressure required for the ultrafiltration is 1.01 kg/cm$^2$ at the time of 5 minutes from the start of water feeding, and is 1.03 kg/cm$^2$ after 200 hours of continuous ultrafiltration. No breakage of hollow fibers is observed after 200 hours of continuous ultrafiltration.

EXAMPLE 5

Substantially the same procedure as described in Example 3 is repeated except that in the fabrication of the casing 3, nozzle-having segment 9 and cylindrical pipe segment 10 are separately prepared and connected to each other, and that the inner surface of the pipe segment 10 is tapered so that the inner diameter of the casing 3 is 143 mm at both end portions thereof and decreased to a minimum of 130 mm over a length of 6.5 mm at a region where the nozzle-having segment 9 and the cylindrical pipe segment 10 are connected to each other. Thus, the inner wall surface of the cylindrical casing has a tapered cross-section portion in which the tapered cross-section is tapered at an angle ($\theta$) of approximately 45°.

Pure water of 25° C. is fed through the nozzle 2 into the module at a rate of 9.5 m$^3$/hr, thereby effecting ultrafiltration at a rate of 9.0 m$^3$/hr.

The pressure required for the ultrafiltration is 1.01 kg/cm$^2$ at the time of 5 minutes from the start of water feeding, and is 1.05 kg/cm$^2$ after 200 hours of continuous ultrafiltration. No breakage of hollow fibers is observed after 200 hours of continuous ultrafiltration.

COMPARATIVE EXAMPLE 1

Substantially the same procedure as described in Example 3 is repeated except that the hollow of the nozzle 2 has a diameter of 33 mm unchanged along the axis of the nozzle 2, and that the rounding of the lower inner end portion of the nozzle wall of the nozzle 2 is not carried out.

Ultrafiltration is performed by feeding pure water of 25° C. through the nozzle 2 into the module. The water pressure required for obtaining an ultrafiltration rate of 9.0 m$^3$/hr is 1.3 kg/cm$^2$.

What is claimed is:

1. A hollow fiber filter module
said filter module to be used for external pressure type filtration in which a liquid to be filtered is brought into contact with the outer wall surface of a hollow fiber membrane and a filtrate is withdrawn from the inner wall surface of the membrane, comprising,
a substantially cylindrical casing having a liquid introducing nozzle at least at one end portion of the cylindrical casing in its periphery and having a bundle of porous hollow fibers disposed in said cylindrical casing along the length of said cylindrical casing, each porous hollow fiber having an opening in at least one end of said fiber, said bundle of hollow fibers being connected at both ends thereof to end portions of said cylindrical casing, saod bundle of porous hollow fibers being enclosed at one end portion of said bundle corresponding to said end portion having said liquid introducing nozzle by a hollow, liquid flow control member securely provided in the cylindrical casing, said liquid flow control member being positioned so as to provide a spacing between the outer surface of said control member and the inner surface of said cylindrical casing,
said liquid introducing nozzle comprising an outer opening, an inlet opening in the peripheral wall of the cylindrical casing and a nozzle wall stemming from the circumference of said inlet opening in the peripheral wall of the cylindrical casing to said outer opening and having an extended hollow which is defined by the inner surface of said nozzle wall extending from said outer opening toward said inlet opening, said inlet opening having a larger diameter than that of said hollow at any portion thereof, inclusive of said outer opening, said diameter of said inlet opening being defined as a diameter measured across the opening at the inner walls surface of said cylindrical casing, whereby the resistance to the liquid in said liquid introducing nozzle is held down to a minimum so that the pressure of the liquid can be effectively exerted on the hollow fibers.

2. The module according to claim 1, wherein the diameter of said hollow of said liquid introducing nozzle continuously decreases over a distance of at least 5% of said nozzle wall, based on the entire length of said nozzle wall, from said inlet opening toward said outer opening.

3. The module according to claim 1, wherein the inner wall surface of said cylindrical casing has at its portion extending from said end portion containing said control member toward a central portion of said casing and facing said control member a tapered cross-section portion such that the inner diameter of the cylindrical casing becomes small toward said central portion.

4. The module according to claim 3, wherein said tapered cross-section is tapered at an angle ($\theta$) of not greater than 45°.

5. The module according to claim 4, wherein said angle ($\theta$) is not greater than 30°.

6. The module according to any one of claims 1 to 5, wherein said cylindrical casing comprises (a) at least one segment having said nozzle and (b) a cylindrical pipe segment which is separated from said segment (a), said segments (a) and (b) being connected to each other by adhesive-bonding or welding.

* * * * *